United States Patent [19]

Uehara et al.

[11] Patent Number: 4,581,661
[45] Date of Patent: Apr. 8, 1986

[54] ERASING APPARATUS EMPLOYING MULTIPLE MAGNETICALLY PREMEABLE MEMBERS

[75] Inventors: Tsukasa Uehara, Tokyo; Tokihiko Ogura; Masaya Maeda, both of Kanagawa, all of Japan

[73] Assignee: Canon Kabushiki Kaisha, Tokyo, Japan

[21] Appl. No.: 560,758

[22] Filed: Dec. 12, 1983

[51] Int. Cl.$^4$ .......................... G11B 5/03; G11B 5/12
[52] U.S. Cl. ........................................ 360/66; 360/118
[58] Field of Search .................................. 360/66, 118

[56] References Cited

U.S. PATENT DOCUMENTS

| | | | |
|---|---|---|---|
| 2,498,423 | 2/1950 | Howell | 360/118 |
| 2,526,358 | 10/1950 | Howell | 360/66 |
| 2,535,481 | 12/1950 | Begun | 360/66 |
| 2,567,092 | 9/1951 | Williams | 360/118 X |
| 2,704,790 | 3/1955 | Gratian | 360/66 |
| 2,736,776 | 2/1956 | Camras | 360/118 |
| 2,816,176 | 12/1957 | Taris et al. | 360/66 |
| 2,854,524 | 9/1958 | Went et al. | 360/66 |
| 2,895,016 | 7/1959 | Moore | 360/66 |
| 2,898,408 | 8/1959 | Folse | 360/66 |
| 2,980,768 | 4/1961 | Ehrer | 360/66 |
| 3,038,036 | 6/1962 | Young | 360/66 |
| 3,156,784 | 11/1964 | Kump | 360/66 |
| 3,371,164 | 2/1968 | Makimura | 360/118 X |
| 3,439,126 | 4/1969 | Atsumi | 360/118 X |
| 3,449,529 | 6/1969 | Camras | 360/66 X |
| 3,723,668 | 3/1973 | Ritchey, Jr. | 360/66 |
| 3,806,828 | 4/1974 | Johnson | 360/66 X |
| 4,455,582 | 6/1984 | Yanagida et al. | 360/66 X |
| 4,466,027 | 8/1984 | Howell et al. | 360/66 |

FOREIGN PATENT DOCUMENTS

| | | | |
|---|---|---|---|
| 1912272 | 3/1968 | Fed. Rep. of Germany | 360/66 |
| 46-15871 | 4/1971 | Japan | 360/118 X |
| 54-43009 | 4/1979 | Japan | 360/66 |
| 57-82260 | 5/1982 | Japan | 360/118 |

OTHER PUBLICATIONS

McKnight–Journal of Audio Engg. Society 6/63, vol. 11, No. 3, pp. 223-233.
I.B.M.T.D.B. vol. 9, No. 7 12/66, p. 764.

*Primary Examiner*—Raymond F. Cardillo
*Assistant Examiner*—Alyssa H. Bowler
*Attorney, Agent, or Firm*—Toren, McGeady, Stanger, Goldberg & Kiel

[57] ABSTRACT

The disclosed erasing apparatus serves for erasing a signal from individual recording tracks of a magnetic recording medium. A soft magnetic and high permeability member forms a magnetic circuit which passes through a magnetic head and the recording medium. A suitable arrangement causes either the magnetic head or the high permeability member to produce a magnetic field for erasing the signal.

12 Claims, 13 Drawing Figures

ERASING APPARATUS EMPLOYING MULTIPLE MAGNETICALLY PREMEABLE MEMBERS

BACKGROUND OF THE INVENTION

1. Field of the Invention:

This invention relates to an erasing apparatus and more particularly to an apparatus adapted for erasing a signal recorded on a magnetic recording medium from individual recording tracks.

2. Description of the Prior Art:

A magnetic recording and/or reproducing apparatus using a recording medium such as a rotary magnetic disc or drum, records a video signal or the like to form an annular recording track on the medium, and/or reproduces the thus recorded signal from the track. Proposals have been made to have such magnetic recording and/or reproducing devices utilize erasing contrivances capable of erasing recorded signals from individual recording tracks. Conventional erasing mechanisms of that type employ a recording or reproducing magnetic head or a magnetic head adapted solely for erasing, and delete signals by applying an AC or DC erasing signal to the head.

However, conventional erasing apparatuses have been unsatisfactory due to inadequate erasing efficiency, an excessively long erasing time required for each specific recording track, or to difficulty in erasing over a sufficient width to erase each recording track.

SUMMARY OF THE INVENTION

A general object of the present invention is therefore to provide a novel erasing apparatus which is capable of eliminating the above-stated shortcomings of the conventional apparatuses.

A more specific object of the invention is to provide an erasing apparatus which is capable of eliminating the shortcomings of the conventional apparatus by efficiently and accurately erasing a recorded signal of each individual recording track formed on a recording medium.

Another object of the invention is to provide an erasing apparatus capable of enhancing the magnetic flux density of an erasing magnetic field at the tip of a magnetic head. For these objects, a preferred embodiment of this invention representing an aspect thereof comprises a magnetic head, a soft magnetic and high permeability member disposed in a position to form a magnetic circuit passing through a magnetic recording medium and the magnetic head and means for causing either the magnetic head or the high permeability member to generate a magnetic field for signal erasing.

A further object of the invention is to provide a record erasing apparatus which is capable of efficiently and accurately erasing a recorded signal from each individual recording track formed on a recording medium and is also capable of effecting signal erasing over an erasing width wider than the width of each recording track.

To achieve these objects, another preferred embodiment representing another aspect thereof comprises a magnetic head, a soft magnetic and high permeability member disposed in a position to form a magnetic circuit passing through a magnetic recording medium and the magnetic head and means for causing either the magnetic head or the high permeability member to generate a magnetic field for signal erasing; and wherein, assuming that the thickness of the magnetic head at the gap portion is "a", the total thickness of the head is "b" and the width of a guard band between adjacent recording tracks is "c", the total thickness of the magnetic head is arranged to satisfy the following condition:

$$a < b \leq a + 2c$$

These and further objects and features of the invention will become apparent from the following detailed description of the preferred embodiments thereof taken in conjunction with the accompanying drawings.

BRIEF DESCRIPTION OF THE DRAWINGS

The accompanying drawings show some preferred embodiments of the present invention, in which.

DETAILED DESCRIPTION OF THE PREFERRED EMBODIMENTS

Embodiment I (FIGS. 1-4)

Figure 1:
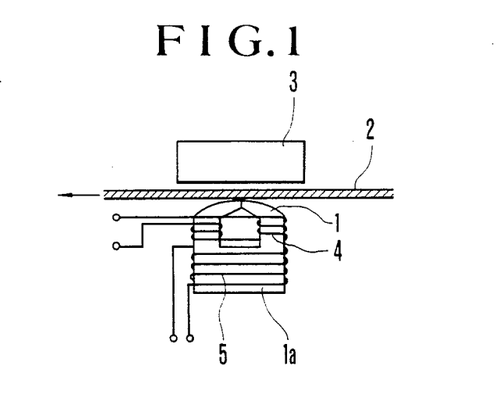
FIG. 1 is an illustration showing the arrangement of the essential parts of an erasing apparatus embodying the present invention.

In FIG. 1, a reference numeral 1 denotes a magnetic head. A numeral 2 denotes a disc-shaped magnetic sheet which is shown by way of example as a recording medium. The magnetic sheet 2 is arranged to be driven by a motor to rotate relative to the magnetic head 1 in a direction of the arrow. A soft magnetic and high permeability member 3 is fixedly disposed in a position confronting the magnetic head 1 across the magentic sheet 2. The magnetic head 1 is made of a magnetic material preferably selected from soft magnetic materials of high permeability such as ferrite, Sendust, Permalloy and amorphous magnetic substances. The magnetic surface of the magnetic sheet 2 is preferably made of a metal material or an iron oxide material. In case the magnetic surface of the magnetic sheet 2 is made of a metal material, the magnetic head 1 is preferably made of an alloy such as Sendust or an amorphous magnetic substance. If the magnetic surface of the magnetic sheet 2 is made of an iron oxide material, it is preferable to use a head made of ferrite. The high permeability member 3 is made of the same soft magnetic material as that of the magnetic head 1. The clearance between the magnetic head 1 and the magnetic sheet 2 is 0.05 μm or thereabout. The closer the high permeability material 3 to the magnetic sheet 2, the better will be the result obtainable.

An ordinary recording or reproducing coil 4 is wound around the magnetic head 1 and is connected to a recording or reproducing signal processing circuit. An erasing coil 5 is also wound around the magnetic head 1 and is connected to an erasing signal generating circuit. The erasing coil 5 is arranged to produce a magnetic field from the tip of the magnetic head 1 in a direction perpendicular to the magnetic sheet 2. For that purpose, the coil 5 is, for example, wound around the whole base part 1a of the magnetic head 1. The erasing signal to be generated may be of a direct current. However, in consideration of magnetization of the magnetic head 1, use of an alternating current is preferred for the erasing signal.

Figure 2A:
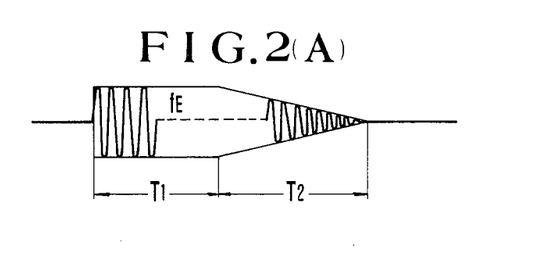
FIGS. 2(A), 2(B) and 2(C) show the wave forms of erasing signals to be supplied to the erasing coil of the erasing apparatus of FIG. 1 and an example of an erasing signal generating circuit arranged to generate the erasing signals.
Figure 2B:
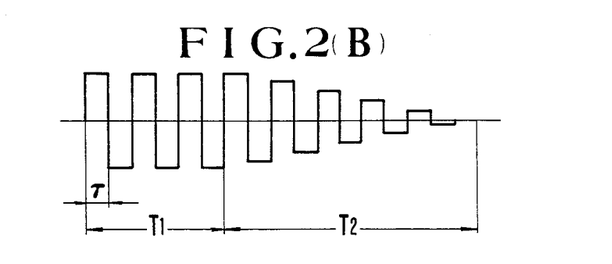

Typical wave form examples of the erasing signal are as shown in FIGS. 2(A) and 2(B). FIG. 2(A) shows a low frequency AC oscillation wave form having a constant oscillation period T1 and an attenuating oscillation period T2 which follows the period T1. The frequency fE of the signal is preferably a low frequency outside of the frequency band of the recording or reproducing signal. For example, let us assume that the recording or reproducing signal is a video signal and that the magnetic sheet 2 rotates at 3,600 r.p.m. with one turn thereof arranged to be equal to the one field period of the video signal. In that instance, the frequency fE of the erasing signal is preferably between 0.5 and 5 KHz, the constant oscillation period T1 between 0.1 and 1 sec. and the attenuating oscillation period T2 between 1 and 2 sec. Further, with the period T1 arranged to be between 0.2 and 0.4 sec., the amplitude of the constant oscillation is preferably between 30 and 40 mA. In the event that the rotating velocity of the magnetic sheet 2 is extremely low, the frequency fE of the erasing signal is increased up to several MHz or thereabout.

FIG. 2(B) shows an erasing signal consisting of a period T1 of a rectangular wave which is positive-and-negative inverted at a constant amplitude and a period T2 which follows the period T1 and is alternately positive-and-negative inverted with amplitude gradually decreasing until it comes to nought. In this instance, the half period τ of the rectangular wave form is arranged, for example, to be equal to the period of one turn of the magnetic sheet 2.

Figure 2C:
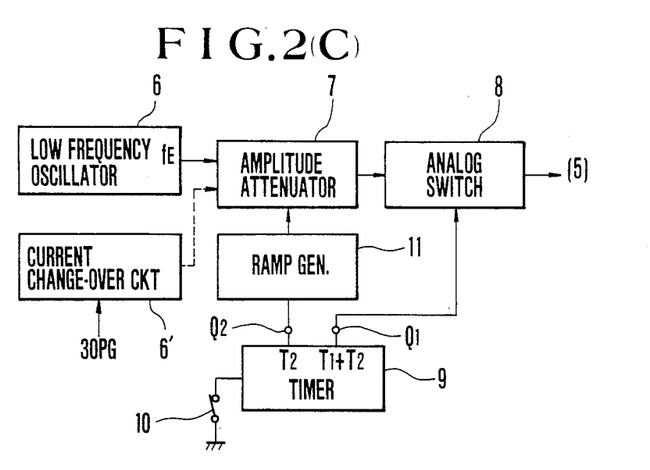

FIG. 2(C) is a block diagram showing a specific embodiment of the erasing signal generating circuit which is arranged to generate an erasing signal such as the signal shown in FIG. 2(A) or 2(B). For obtaining the erasing signal of FIG. 2(A), the circuit of FIG. 2(C) is arranged as follows: The erasing signal generating circuit includes a low frequency oscillator 6 which generates an AC signal of fixed amplitude at the frequency fE. The AC signal is supplied to an analog switch 8 via an amplitude attenuator 7. When this analog switch 8 is turned on, the AC signal is produced from the analog switch 8. A timer 9 is arranged to define a total period T1+T2 which is the sum of the above-stated periods T1 and T2 and also to define the period T2 which follows the period T1 with a switch 10 turned off. For example, a control signal whose level becomes high during the total period T1+T2 is produced at the terminal Q1 of the timer 9 while another control signal whose level becomes high only during the period T2 after the period T1 is produced at another terminal Q2 of the timer 9. The control signal from the terminal Q1 is supplied to the analog switch 8. Accordingly, the analog switch is turned on and remains on during the total period T1+T2. An erasing signal is produced while the analog switch 8 is turned on. Meanwhile, the control signal from the terminal Q2 is supplied to a ramp generator 11. In response to the control signal, the ramp generator 11 produces a ramp voltage which gradually increases. The ramp voltage is supplied to the amplitude attenuator 7 as a control voltage. Under a condition in which the ramp voltage is not produced from the ramp generator 11, the attenuator 7 allows the output signal of the low frequency oscillator 6 to pass therethrough without attenuation. However, the attenuator 7 gradually attenuates the amplitude of the output signal of the low frequency oscillator 6 as the ramp voltage from the ramp generator 11 gradually increases. The ramp generator 11 is arranged to increase the ramp voltage at a rate such that the damping factor of the attenuator 7 comes close to 100% at the end of the above-stated period T2.

Next, for obtaining another erasing signal shown in FIG. 2(B), the circuit of FIG. 2(C) is arranged as follows: In that instance, a current change-over circuit 6' is connected to the amplitude attenuator 7 in place of the low frequency oscillator 6. This current change-over circuit 6' is arranged to alternatey produce constant positive and negative currents in response to a control signal. This control signal is a pulse signal 30PG of 30 Hz, duty cycle of 50%, which is formed on the basis of a rotation phase signal obtained per turn of the magnetic sheet 2. The current change-over circuit 6' produces, for example, a positive current when the pulse signal 30PG is at a high level and the negative current when the pulse signal is at a low level. This pulse signal 30PG is identical with a video head switching signal employed for a well known video cassette recorder (VCR) arranged according to the NTSC system.

The erasing signal which is thus produced from the analog switch 8 is supplied to the erasing coil 5 of the magnetic head 1 shown in FIG. 1.

Figure 3:
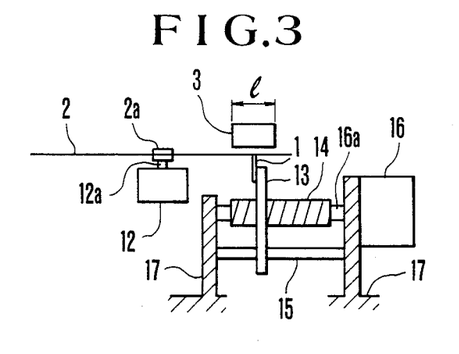
FIG. 3 is a longitudinal sectional view showing a head feeding mechanism to be included in the erasing apparatus of FIG. 1.

Referring now to FIG. 3, an embodiment of the head feeding mechanism which is usable in accordance with this invention is arranged as follows: In FIG. 3, the same reference numerals as those used in FIG. 1 indicate the same parts. In the head feeding mechanism, a motor 12 rotates the magnetic sheeet 2 through an output shaft 12a. The magnetic sheet 2 is provided with a center core 2a which is disposed in the central part of the magetic sheet 2. The output shaft 12a of the motor 12 is connected to the center core 2a. A head mount 13 has a screwed portion for engaging with feed screw 14. A guide member 15 is provided for the head mount 13. The feed screw 14 is secured to a shaft 16a of a head feeding motor 16. A chassis 17 is arranged for the apparatus. In this apparatus, the rotating motion of the head feeding motor 16 is converted into a linear motion of the head mount 13 to the right or left as viewed on the drawing. This linear motion causes the magnetic head 1 to move in the radial direction of the magnetic sheet 2. Meanwhile, the high permeability member 3 is arranged to be of sufficient length l for covering the moving range of the head 1.

In this specific embodiment, for erasing a recorded signal of some recording track on the magnetic sheet 2, the magnetic head 1 is shifted to a position opposite to that recording track. In this condition, the erasing signal is produced from the erasing signal generating circuit of FIG. 2(C). The erasing signal is then supplied to the erasing coil 5. As a result, a magnetic field extends from the magnetic head 1 toward the high permeability member 3 and penetrates the magnetic sheet 2 almost perpendicularly. However, the presense of the high permeability member 3 prevents the magnetic flux thus produced from spreading and causes it to converge in the area at the tip of the head 1. The magnetic flux density in that area thus becomes extremely high. Besides, since the erasing magnetic flux passes almost perpendicularly through the magnetic sheet 2, the recorded signal in that part is efficiently and accurately erased.

Figure 4:
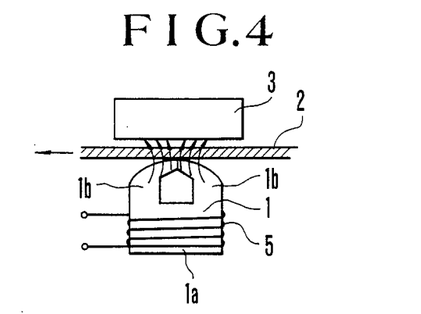
FIG. 4 is an illustration showing the operation of the erasing apparatus shown in FIG. 1.

The condition of the magnetic flux produced by the erasing signal is shown in FIG. 4. As shown, the erasing magnetic flux flows in an in-phase manner in the same direction through two leg parts 1b of the magnetic head 1 which has the recording or reproducing coil 4 wound thereon as shown in FIG. 1. This represents a feature of the embodiment. In FIG. 4, the recording or reproducing coil 4 stated above is omitted from the illustration. In case the erasing signal shown in FIG. 2(A) is employed, the area of the desired recording track of the magnetic sheet 2 is saturated and magnetized during the constant oscillation period T1 to erase the recorded signal of the recording track. After that, during the ensuing attenuating oscillation period T2, any distortion is removed to complete the erasing action. In this instance, use of an erasing signal of low frequency outside of the frequency band of the recording or reproducing signal enables use of the high permeability region of the magnetic head 1 for a higher erasing efficiency, so that the recorded signal can be erased in a short period of time. The same advantages are attainable with the erasing signal of FIG. 2(B).

Figure 5:
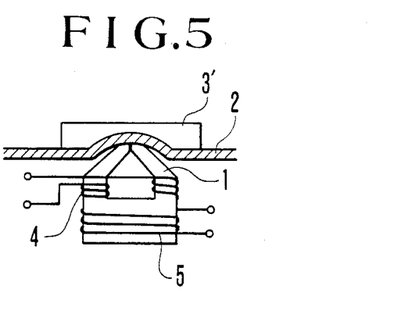
FIGS. 5 and 6 are illustrated showing essential parts arranged in two modifications of the erasing apparatus shown in FIG. 1.
Figure 6:
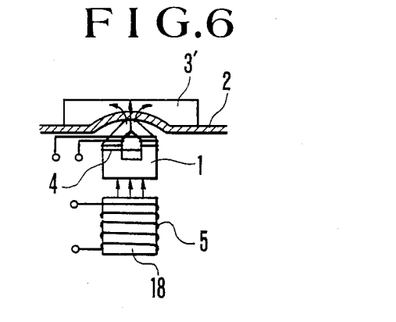

Examples of Modification of Embodiment I (FIGS. 5 and 6)

In an example of modification of the first embodiment described above, magnetic field distribution is arranged to be steeper by forming a part of the high permeability member 3 located closer to the magnetic head 1 into an edge shape.

Further, in the event that the magnetic sheet 2 is a flexible sheet, a stabilizing member which is arranged to stabilize the contacting state between the magnetic head 1 and the magnetic sheet 2 is made of a high permeability material. As shown in FIG. 5, the soft magnetic and high permeability member 3' is arranged to serve also as the stabilizing member. This arrangement permits shortening the distance between the high permeability member 3' and the magnetic head 1. Then, the magnetic field converging onto the recording track to be erased on the magnetic sheet 2 becomes more intense to enhance the erasing efficiency.

Further, in the event that the arrangement of the magnetic head 1 does not permit winding the erasing coil 5 directly on the head core, the erasing coil 5 may be wound around a block 18 which is made of a soft magnetic and high permeability material and is disposed close to the magenetic head 1 as shown in FIG. 6.

In the embodiment shown in FIG. 1 and the modification examples shown in FIGS. 5 and 6, the erasing efficiency increases according as width of the high permeability member 3 or 3' in the lateral direction as viewed on the drawing is closer to the width of the magnetic head 1 in the lateral direction as viewed on the drawing. Further, the erasing efficiency also increases the closer high permeability member 3 or 3' is positioned to the magnetic head 1.

In accordance with the invention, the shape of the tip of the magnetic head 1, the total thickness of the head 1, the thickness of the head 1 at the gap part thereof and the width of the guard band between adjacent recording tracks on the magnetic sheet 2 are arranged to be in such relation that the erasing width can be made wider than the width of the recording track. This ensures perfect erasure irrespective of some deviation of the head from the track.

Figure 7:
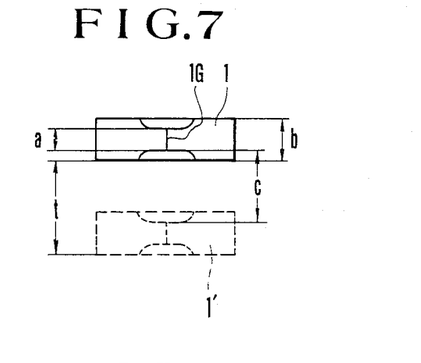
FIG. 7 is a schematic illustration of a magnetic head usable for the erasing apparatus according to the invention, the illustration showing the head as viewed from above.

This will be understood from the illustration of FIG. 7. In FIG. 7, a reference numeral 1G denotes the gap of the magnetic head 1. The thickness of the magnetic head 1 at the gap 1G is "a". A reference symbol "b" denotes the total thickness of the magnetic head 1; "c" denotes the width of the guard band between adjacent recording tracks; and "t" denotes a track pitch. Further, a numeral 1' denotes a position of the magnetic head 2 when it is shifted to an adjacent recording track. In this case, the width of the recording track is "a" at the time of recording or reproduction. Whereas, it is erased over a width of "b". Generally, the total thickness "b" of the magnetic head 1 must satisfy either a relation of $a < b \leq a + 2c$ or another relation of $a < b \leq a + 2 \times c/2$. With the total thickness of the magnetic head 1 arranged in this manner, the recording track can be erased over a wider extent than the width of the track. This arrangement prevents an adjacent track from being affected even when the magnetic head deviates from the recording track to be erased.

Figure 8:
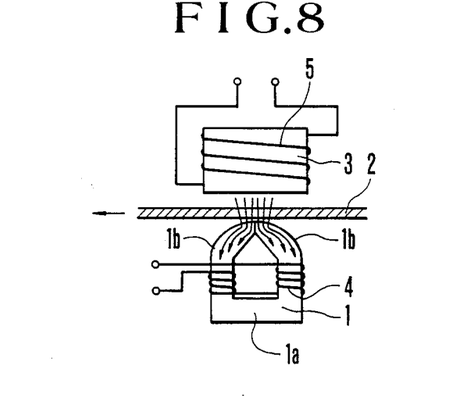
FIG. 8 is an illustration showing the arrangement of the essential parts of an erasing apparatus embodying the invention as another embodiment thereof.

Embodiment II (FIG. 8)

In the first embodiment described above, the erasing coil is wound around the magnetic head 1 (or around the auxiliary member 18 in the case of the modification shown in FIG. 6). Whereas, in the case of a second embodiment which is shown in FIG. 8, the erasing coil 5 is wound around the high permeability member 3. With the exception of this point, the reset of arrangement of the second embodiment is identical with the first embodiment. In FIG. 8, the same parts are indicated by the same reference numerals as those used in FIG. 1.

With the embodiment arranged as mentioned above, when the erasing signal of FIG. 2(A) or 2B produced by the erasing signal generating circuit of FIG. 2(C) and supplied to the erasing coil 5, and with the magnetic head 1 shifted to a recording track to be erased on the magnetic sheet 2, a magnetic field is then produced by the high permeability member 3 toward the magnetic head 1 penetrates the magnetic sheet 2 almost perpendicularly. Then, the presence of the magnetic head 1 which is made of a high permeability material and that of the high permeability member 3 cause the magnetic flux thus produced to converge onto an area at the tip of the magnetic head 1. As a result, the magnetic flux density at the tip of the magnetic head 1 becomes extremely high. In addition to that, the erasing magnetic flux penetrates the magnetic sheet almost perpendicularly. Therefore, the recorded signal in that area is efficiently and accurately erased. Further, in this instance, as shown in FIG. 8, the erasing magnetic flux which almost perpendicularly penetrates the magnetic sheet 2 flows through two leg parts 1b of the magnetic head 1 in the same direction and then via a space or some suitable magnetic path, returns to the high permeability member 3. A magnetic circuit is thus formed.

Figure 9:
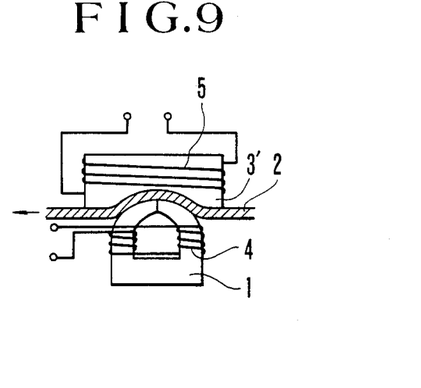
FIG. 9 is an illustration showing essential parts arranged in a modification of the erasing apparatus shown in FIG. 8.
Figure 10:
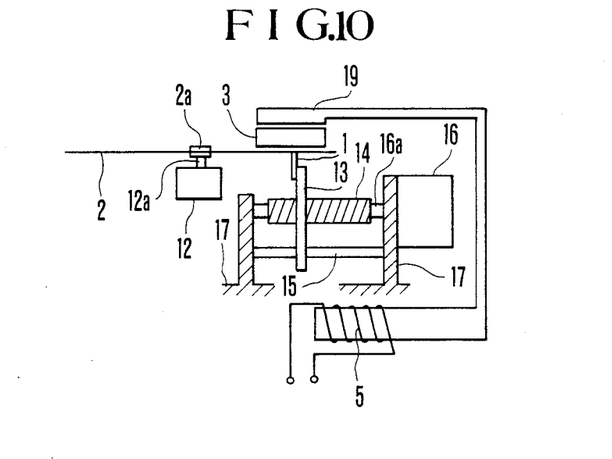
FIGS. 10 and 11 are longitudinal sectional views showing two erasing apparatuses as further modified embodiments.
Figure 11:
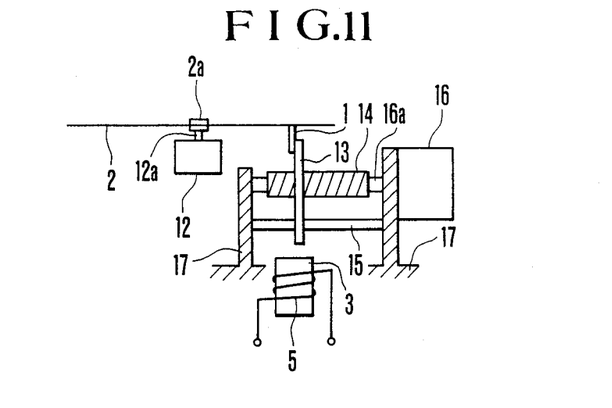

Examples of Modification of Embodiment II (FIGS. 9, 10 and 11)

In a modification of the second embodiment shown in FIG. 8, magnetic field distribution is arranged to be steeper by forming a part of the high permeability member located closer to the magnetic head 1 into an edge shape in the same manner as mentioned in the foregoing with regard to the modification example of the first embodiment.

Further, the high permeability member 3' is arranged also to serve as a stabilizing member as shown in FIG. 9 in the same manner as in the modification of the first embodiment shown in FIG. 5. Referring to FIG. 9, the erasing coil 5 is wound around this high permeability member 3'. This arrangement permits shortening the distance between the high permeability member 3' and the magnetic head 1 for more intense convergence of the magnetic field for the recording track to be erased on the magnetic sheet 2 it thus permits more efficient erasing.

In the case of another modification shown in FIG. 10, a magnetic path forming member 19 which is made of a soft magnetic and high permeability material is arranged to extend to the lower side of the apparatus. The member 19 forms a magnetic circuit in conjunction with the high permeability member 3 which may be arranged to serve the combined purpose of stabilizer as mentioned in the foregoing. In this instance, the erasing coil 5 is wound around a part of the magnetic path member 19 instead of the high permeability member 3. Further, if the high permeability member 3 is arranged to perform the combined function of stabilizer, the member 3 is preferably arranged separately from the magnetic path member 19 to facilitate head touch adjustment. If not, the two may be arranged integrally. In that event, the erasing coil 5 may be wound around in any convenient part of the integral body of the magnetic path member 19.

A further modification is arranged as shown in FIG. 11. In that case, the high permeability member 3 is disposed beneath the magnetic head mount 13. A magnetic circuit is formed to pass through the high permeability member 3, the magnetic sheet 2 and the magnetic head 1 in the same manner as in the case of the preceding example. In this case of the head mount 13 should be made of a soft magnetic and high permeability material.

The comments on the first embodiment and its modifications also apply to the second embodiment and its modifications described above with reference to FIGS. 8-11. For example, the relation of the erasing efficiency to the width and the confronting distance of the head 1 and the high permeability member 3 or 3' in the arrangements shown in FIGS. 8 and 9 is the same as in the first embodiment and its modifications. Also, the condition for making the erasing width wider than width of the recording track to be erased is also the same as the condition described with reference to FIG. 7.

The erasing apparatus according to the invention, as has been described in detail, is capable of increasing the magnetic flux density at the tip of the magnetic head and is thus arranged to efficiently and accurately erase a recorded signal.

Further, the total thickness and the gap width of the magnetic head and the width of the guard band between adjacent recording tracks are arranged to have a relationship that permits erasing over a wider width than the width of the recording track to be erased. This allows erasing to be satisfactorily accomplished irrespective of positional deviation of the magnetic head from the recording track.

What we claim is:

1. An erasing apparatus for erasing a recorded signal from a magnetic medium, comprising:
   (A) a magnetic head;
   (B) first means for forming a magnetic circuit passing through said magnetic medium and said magnetic head, said first means including a first magnetically permeable and soft magnetic member with a high magnetic permeability; and
   (C) second means for causing one of said magnetic head and said first means to produce a magnetic field for erasing a signal;
   (D) said second means including:
      (D1) a second magnetically permeable and soft magnetic member having a high magnetic permeability and disposed adjacent to said magnetic head;
      (D2) a winding coupled to said second magnetically permeable member; and
      (D3) an erasing signal supply circuit for supplying said winding with an erasing signal.

2. The apparatus according to claim 1, wherein said recorded signal has a predetermined reproducible frequency range, and said erasing signal supply circuit supplies the erasing signal so the signal has a frequency lower than those within said predetermined reproducible frequency range of the recorded signal and include a signal section with a gradually decreasing amplitude.

3. The apparatus according to claim 2, wherein said erasing signal supply circuit supplies the signal so as further to include a signal section with a constant amplitude before said signal section with the gradually decreasing amplitude.

4. The apparatus according to claim 1, wherein said first magnetically permeable member and said magnetic head are arranged in close proximity so as to sandwich the magnetic medium therebetween.

5. The apparatus according to claim 4, wherein said magnetic medium is flexible, and the apparatus further comprises drive means for moving said magnetic medium relative to said magnetic head.

6. The apparatus according to claim 5, wherein said first magnetically permeable member is formed as a stabilizing means for stabilizing a portion of said magnetic medium passing said magnetic head.

7. The apparatus according to claim 1, wherein said magnetic medium has a plurality of tracks each recorded with a signal, and the apparatus further comprises positioning means for positioning said magnetic head relative to selected one of tracks for erasing the recorded signal therefrom.

8. The apparatus according to claim 7, wherein said magnetic head has a magnetic gap; said magnetic medium further has a guard band between each of the tracks; and the head and the medium together satisfy the following condition:

$$a < b \leq a + 2c$$

where
   $a$: thickness of the head at the gap, b: total thickness of the head, c: width of the guard band.

9. An erasing apparatus for erasing a recorded signal from a selected one of a plurality of circular tracks of a rotary type magnetic medium, comprising:

(A) a magnetic head;

(B) a first magnetically permeable and soft magnetic member having a high magnetic permeability and disposed adjacent to said magnetic head, said permeable and disposed adjacent to said magnetic head, said permeable member having a winding;

(C) a second magnetically permeable and soft magnetic member having a high magnetic permeability and disposed adjacent to said magnetic head so as to sandwich the magnetic medium therebetween;

(D) positioning means for positioning said magnetic head relative to said selected track of the magnetic medium;

(E) rotating means for rotating said magnetic medium relative to said magnetic head; and (F) erasing signal supply means for supplying an erasing signal to said winding of said first permeable member.

10. The apparatus according to claim 9, wherein said magnetic head has a magnetic gap and a guard band between each of the tracks; and the head and the medium together satisfy the following condition:

$$a < b \leq a + 2c$$

where a = thickness of the head at the gap, b = total thickness of the head, c = width of the guard band.

11. The apparatus according to claim 9, wherein said recorded signal has a predetermined reproducible frequency range, and said erasing signal supply means supplies the erasing signal so the signal has a frequency lower than those within said predetermined reproducible frequency range of the recorded signal and includes a signal section with a gradually decreasing amplitude.

12. The apparatus according to claim 11, wherein said erasing signal supply means supplies the erasing signal so the signals further includes a signal section with a constant amplitude before said signal section with the gradually decreasing amplitude.

* * * * *

UNITED STATES PATENT AND TRADEMARK OFFICE
CERTIFICATE OF CORRECTION

PATENT NO. : 4,581,661

DATED : April 8, 1986

INVENTOR(S) : Tsukasa Uehara, et al

It is certified that error appears in the above-identified patent and that said Letters Patent is hereby corrected as shown below:

In the heading of the patent it should read:

-- [30] Foreign Application Priority Data

December 15, 1982[JP]  Japan .......57 219657
December 15, 1982[JP]  Japan .......57 219658 --

Signed and Sealed this

Fifth Day of August 1986

[SEAL]

Attest:

DONALD J. QUIGG

Attesting Officer

Commissioner of Patents and Trademarks